United States Patent
Nagaraj et al.

(10) Patent No.: US 7,630,711 B2
(45) Date of Patent: Dec. 8, 2009

(54) METHOD AND SYSTEM FOR MAPPING PROVISIONING INFORMATION OF DIFFERENT COMMUNICATIONS NETWORKS

(75) Inventors: Thadi M. Nagaraj, San Diego, CA (US); Dhinakar Radhakrishnan, San Diego, CA (US); Michael Green, Zichron Yaacov (IL); Nikhil Jain, San Diego, CA (US); Nileshkumar J. Parekh, San Diego, CA (US); Qiuzhen Zou, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 11/326,635

(22) Filed: Jan. 5, 2006

(65) Prior Publication Data

US 2007/0155420 A1    Jul. 5, 2007

(51) Int. Cl.
*H04W 4/00* (2006.01)
(52) U.S. Cl. ............... 455/432.1; 455/432.2; 455/552.1
(58) Field of Classification Search .............. 455/432.1, 455/432.2, 552.1
See application file for complete search history.

(56) References Cited

U.S. PATENT DOCUMENTS 7,349,695 B2 * 3/2008 Oommen et al. .......... 455/432.1
2005/0227688 A1 10/2005 Li et al.
2006/0079224 A1 * 4/2006 Welnick et al. .......... 455/432.1
2006/0234705 A1 * 10/2006 Oommen .................. 455/435.3
2006/0282554 A1 * 12/2006 Jiang et al. ..................... 710/14
2007/0155421 A1 * 7/2007 Alberth et al. ........... 455/553.1

FOREIGN PATENT DOCUMENTS

| | | |
|---|---|---|
| DE | 10308012 | 9/2004 |
| WO | 9730561 | 8/1997 |
| WO | 9809462 | 3/1998 |
| WO | 2005122601 | 12/2005 |

OTHER PUBLICATIONS

International Search Report—PCT/US07/060185—International Search Authority—European Patent Office—Nov. 22, 2007.

* cited by examiner

*Primary Examiner*—Barry W Taylor
(74) *Attorney, Agent, or Firm*—Albert J. Harnois, Jr.; Florin Corie (57) ABSTRACT

A wireless communications device is configurable to communicate with either one of two networks over a wireless medium, each of the two networks having a different air interface protocol. Additionally, the wireless device includes stored provisioning information for a set of networks of a first type and can map this first provisioning information into a second format for use with networks of a second type. The device also includes a non-volatile memory for storing default provisioning information so that some information remains available regardless of what is erased from the memory. The default provisioning information is enough to establish a connection over one of the available networks and allow reconstruction of a provisioning list.

34 Claims, 6 Drawing Sheets

COMBINATION LIST

| MCC | MNC | | SID | NID |
|---|---|---|---|---|
| $n_1$ | $m_1$ | → | $x_1$ | $y_1$ |
| $n_2$ | $m_2$ | → | $x_2$ | $y_2$ |
| $n_3$ | $m_3$ | → | $x_3$ | $y_3$ |

| NETWORK TYPE 1 | NETWORK TYPE 2 | NETWORK TYPE 3 |
|---|---|---|
| DEFAULT INFORMATION 703 | DEFAULT INFORMATION 705 | DEFAULT INFORMATION 707 |
| PROVISIONING INFORMATION 710 | PROVISIONING INFORMATION 712 | PROVISIONING INFORMATION 714 |
| LIST ENTRIES 702 | LIST ENTRIES 704 | LIST ENTRIES 706 |

METHOD AND SYSTEM FOR MAPPING PROVISIONING INFORMATION OF DIFFERENT COMMUNICATIONS NETWORKS

BACKGROUND

1. Field

The present disclosure relates generally to telecommunications, and more particularly, to telecommunications involving multiple communications networks.

2. Background

Consumer demand for wireless services has led to the development of numerous wireless communication networks. One such network is based on code division multiple access (CDMA) technology which supports wireless voice and data services using spread-spectrum techniques. Spread-spectrum techniques enable high quality service at low cost by efficiently using the available radio frequency (RF) spectrum. As a result, CDMA technology is considered by most to be the next generation of digital wireless communications.

To provide the widest availability of CDMA technology, cost reduction efforts should be employed during implementation. One way to reduce costs is to implement CDMA as an overlay to existing networks such as a Global System for Mobile Communications (GSM). GSM, which has become the defacto standard in Europe and Asia, represents the previous generation of digital wireless communications and utilizes narrowband TDMA to support wireless voice and data services. By implementing CDMA as an overlay to GSM, or other existing systems, reduced cost may be realized because a substantial portion of the existing infrastructure may be used to support CDMA. Within the overlay architecture, the GSM system is augmented to include a CDMA air interface. In this example, a mobile unit may communicate with a GSM core network using either a CDMA or GSM air interface.

The introduction of a CDMA into to a GSM network raises a number of issues. Currently, a GSM mobile unit acquires a connection with a GSM network using provisioning information stored on a removable Subscriber Identity Module (SIM) in the GSM mobile unit. The removable SIM may be installed on any GSM mobile unit, thereby eliminating the need to provision information into a GSM mobile unit every time a new one is purchased by a consumer. Many consumers of GSM products have expressed a certain level of satisfaction with this feature, and therefore, it is desirable to deploy a mobile unit, capable of supporting both a CDMA and GSM air interface, that can accept a SIM from a GSM mobile unit. This will require that certain compatibility issues be addressed to allow the mobile unit to acquire a CDMA wireless network with provisioning information for a GSM wireless network stored on the GSM SIM.

SUMMARY

One aspect relates to a method for generating a provisioning list for a wireless device capable of communicating with multiple network types and having a transceiver configured to communicate with either one of two network types over a wireless medium, each of the two networks having a different air interface protocol. In accordance with this method, respective default provisioning information for a first of the network types is retrieved and first provisioning information for a second of the two network types is also retrieved. The first provisioning information is converted into corresponding provisioning information for the second of the network types. Next, the provisioning list is built using the default provisioning information and the corresponding provisioning information.

Another aspect relates to a wireless device capable of communicating with multiple network types. This device includes a transceiver configured to communicate with any of a plurality of network types over a wireless media, wherein each of the plurality of network types has a different air interface protocol. The device also includes a non-volatile memory configured to store respective default provisioning data for more than one of the plurality of network types.

Yet another aspect relates to a wireless device capable of communicating with multiple network types that includes a transceiver configured to communicate with either one of two network types over a wireless medium, each of the two networks having a different air interface protocol. The device also includes a non-volatile memory configured to store respective default provisioning data for each of the two network types. A processor is also included that is configured to cause the transceiver to establish a connection with one of the two network types using the respective default provisioning data.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
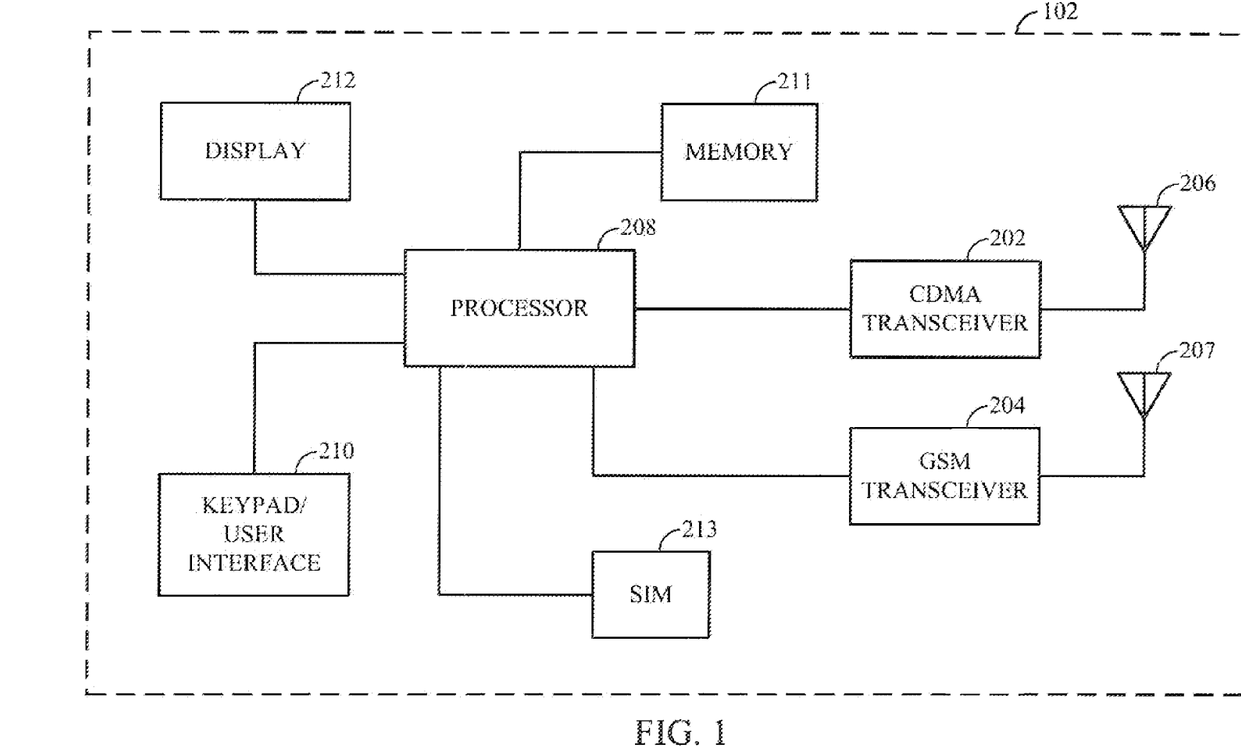
FIG. 1 illustrates a block diagram of a mobile communications device capable of communicating over a CDMA air interface.

FIG. 1 is a functional block diagram illustrating an example of a mobile device capable of supporting wireless communications. The mobile device 102 may include a first air interface transceiver 202 and a second air interface transceiver 204. For example, the transceivers may, respectively be compatible with a CDMA interface and a GSM interface. In at least one embodiment of the mobile device 102, the first air interface transceiver 202 is capable of supporting CDMA2000 1× communications with a BTS (not shown), and the other transceiver 204 is capable of supporting communications with a GSM BTS (not shown). Those skilled in the art will readily appreciate, however, that the concepts described in connection with the mobile device 102 can be extended to other wireless technologies, either alone or in combination with one another. In the mobile device 102, each transceiver 202, 204 may have a separate antenna 206, 207, respectively, as shown, but the transceivers 202, 204 could share a single broadband antenna.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor or microcontroller (not shown) and will have access to a memory 211 that may be volatile, non-volatile or a combination thereof. The microprocessor may be used to support software applications that, among other things, (1) control and manage access to the various wireless networks, and (2) interface the processor 208 to the keypad 210, display, 212, and other user interfaces (not shown). The processor 208 may also include a digital signal processor (DSP) (not shown) with an embedded software layer that supports various signal processing functions. The processor 208 may be a stand-alone entity or distributed across multiple entities in the mobile device 102. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application. In the embodiment of the mobile device 102 described thus far, the processor 208 is also connected to a SIM 213.

Figure 2A:
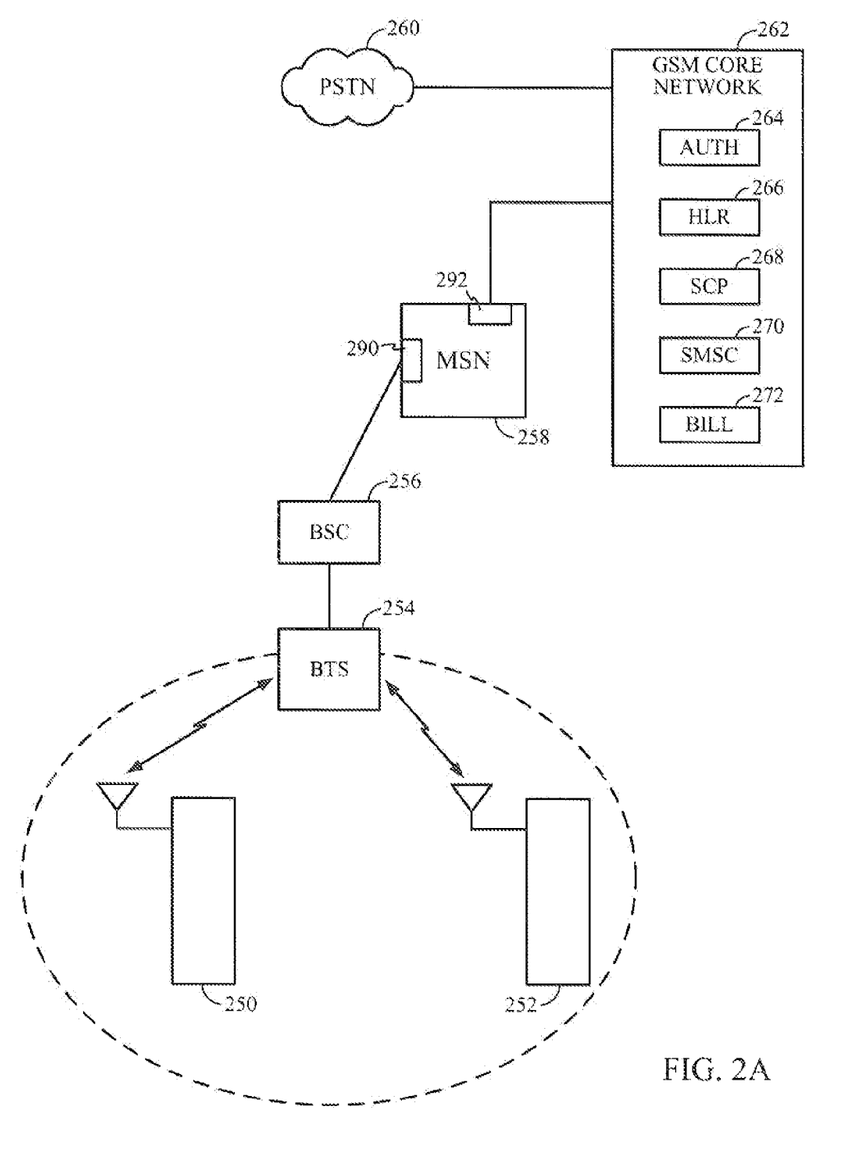
FIG. 2A illustrates an exemplary telecommunications network architecture including a core network different that its air interface.

The communications network architecture of FIG. 2A includes a core network and a radio access network. The core network 262 generally includes those elements on the "top" side of the mobile switching node (MSN) 258. those elements "below" the MSN 258. The MSN 258 is capable of communicating to both the core network 262 and the radio access network. For example, if the core network is a GSM core network, and the radio access network is a CDMA network, the MSN 258 maps messages from formats and structures known in the GSM network to that known in the CDMA network, and vice-versa. Thus, the MSN 258 conceptually includes two interfaces 290, 292. One interface 290 is configured to communicate in a format according to the radio access network and the other interface 292 is configured to communicate according to the core network.

In general, the MSN 258 may be a general purpose programmable computer or a more-specialized computer platform. Regardless of the specific hardware implementation of the MSN 258, a number of software applications or components are stored and executed thereon by one or more processors to perform the functionality described herein. Thus, the MSN 258 not only includes hardware components but also includes executable software applications and computer-readable media for storing such software.

Mobile stations 250 and 252 are wireless communication devices, such as a mobile telephone, a personal digital assistant, computer or other wireless device capable of wireless communication of voice or data information. In one particular configuration, the mobile communications device 250 may be a multi-mode device such as the mobile device 102 described with reference to FIG. 1 that may communicate with a GSM core network through a GSM or CDMA wireless connection. The other mobile communications device 252 may be different in that it includes only one transceiver and is capable of communicating with a GSM core network only through a CDMA wireless connection. In both cases, the mobile device is designed to support the introduction of a CDMA wireless network into an existing GSM system.

The devices 250, 252 communicate with one or more base transceiver stations (BTS) 254 that are connected to a base station controller (BSC) 256. Messages from the BSC 256 are directed to the MSN 258 which, as explained earlier, convert these messages into ones that are used to access various services in the core network 262. For example, as is well known in a GSM core network, certain services are used to enable telephone calls and data transmissions to occur using a public switched telephone network (PSTN) 260. These services include user authentication 264, a home location register 266, Service Control Point 268, messaging service 270, and user billing 272. Not only does the core network 262 receive messages and other data from the MSN 258 but it may also generate messages and other data for the BSC 256, BTS 254, and devices 250, 252. The MSN 258 acts as a translator for these messages as well so that they are appropriately formatted according to the operating air interface.

The above-described networks involving GSM and CDMA technologies were provided merely as an example, and other networking technologies may be used as well without departing from the scope of the present invention. For example, the various principles discusses throughout this disclosure may be extended to a CDMA core network with any number of wireless local area networks (LAN)s dispersed throughout the CDMA network. In that case, the mobile device may be configured to communicate with the CDMA core network through a wireless LAN connection using, for example, 802.11, Bluetooth, or the like.

Figure 2B:
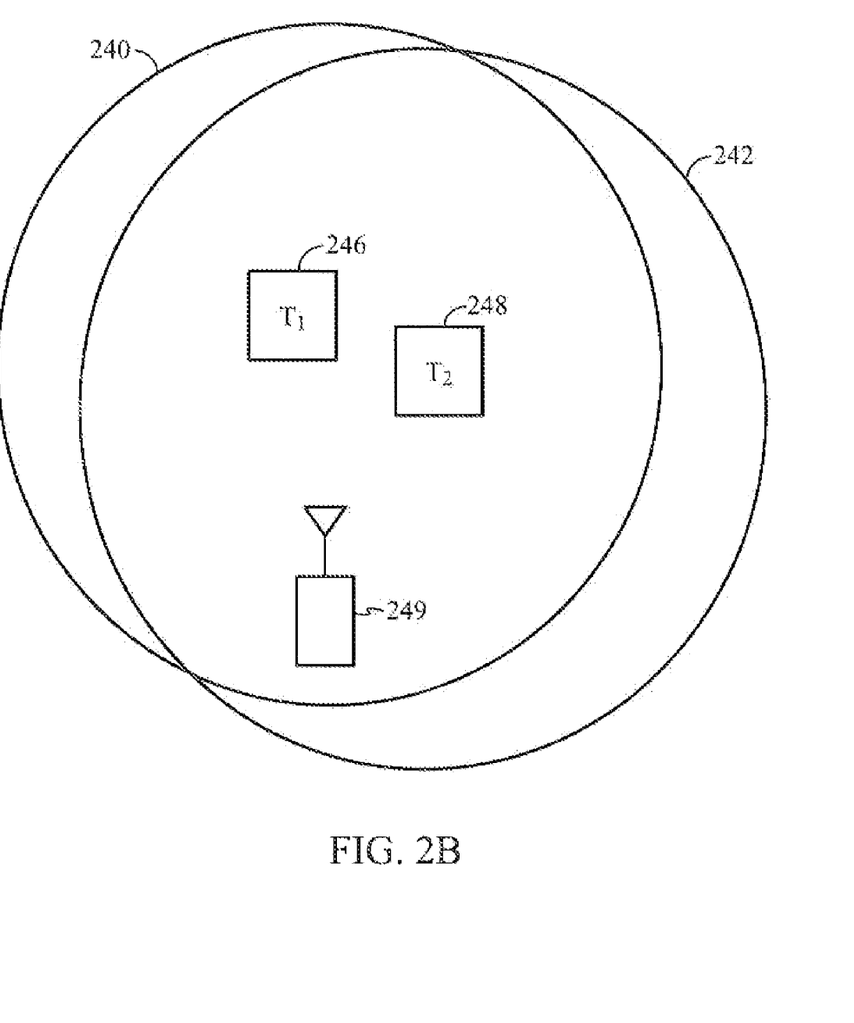
FIG. 2B illustrates two communications networks with overlapping regions.

FIG. 2B depicts the more general environment where the coverage areas 240, 242 for two different communications networks are substantially overlapping. This is because two different transmitter 246, 248 are operating in generally the same area and provide two different air interface protocols over a similar geographic region. As mentioned, these transmitters may be one of any different networking technologies. Thus, a mobile device 249 may access a core network via either air interface protocol when located as depicted in FIG. 2B.

Regardless of the multiple networking technologies that are used, each one utilizes certain provisioning information that pertains to how a particular wireless network is acquired by a mobile device. The mobile device may acquire a wireless network when the device first powers on, when traveling between two different networks, or by a manual event selected by the user. For example, in a GSM wireless network, the mobile device's SIM includes a preferred land mobile network (PLMN) list that identifies the home network, preferred network, and forbidden networks for that subscriber. As is known in the art, this list is used to describe which networks the subscriber may access. For example, when a subscriber is not within his home network, the preferred list may be used to identify which of the available networks should be used.

Figure 3:
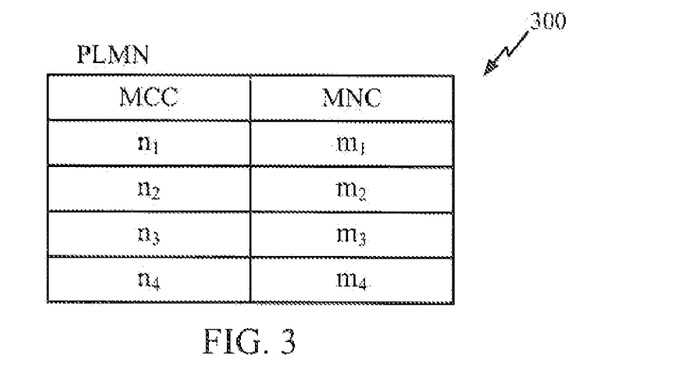
FIG. 3 depicts a memory storing a PLMN list for GSM networks.

A portion of an example PLMN list is shown in the table 300 of FIG. 3. Other information may also be included such as, for example, whether each network is preferred or forbidden. Thus, each row of this table represents a unique network that may be preferred or forbidden. The columns represent the attributes used to identify a GSM network. In particular, a mobile country code (MCC) and mobile network code (MNC) are used as a pair to uniquely identify each GSM network. The MCC is a three digit number (i.e., 000-999) and the MNC is a two or three digit number and are assigned by an international standards governing body. The PLMN list is typically added to the SIM by the operator providing the mobile and the subscriber has the ability to modify the list.

Figure 4:
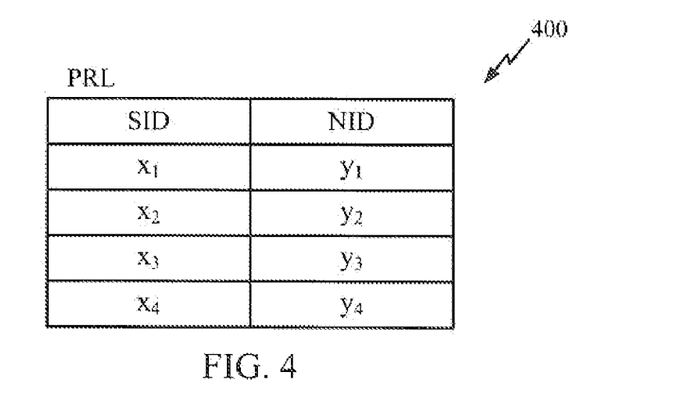
FIG. 4 depicts a memory storing a PRL list for CDMA networks.

In a CDMA network, the analogous provisioning information that identify accessible networks is stored as a preferred roaming list (PRL). This list is periodically transmitted from the network operator to a mobile communications device. This transmission may use either a push or pull model of communication. An example PRL is depicted in FIG. 4 as table 400. Each row of the table represents a unique network and the columns represent the attributes used to uniquely identify a CDMA network. In particular, these attributes are a system identifier (SID) and a network identifier (NID). The SID is a 15-bit number and the NID is a 16-bit number.

A similar table could be generated for wireless LAN networks, for example, that uses BSSID or another MAC-level attribute to uniquely identify each network. Thus, in general, each networking technology includes network identifying information that is fundamentally different. This information may differ in size, in structure, in the way it is assigned, etc. Because of these differences, the CDMA networking capabilities of the mobile communications device is unable to utilize the MCC/MNC information to select preferred partners. Or conversely, the GSM network capabilities of the mobile communications device is unable to use the native SID/NID information to identify GSM networks.

In the example of a communications system in which a mobile device 102 connects through a wireless CDMA network to a GSM core network, it may be desirable to deploy a mobile device 102 capable of using a GSM SIM. In that case, the processor in the mobile device 102 may be used to convert the provisioning information from the GSM SIM into provisioning information suitable for acquiring a CDMA wireless network.

Figure 5:
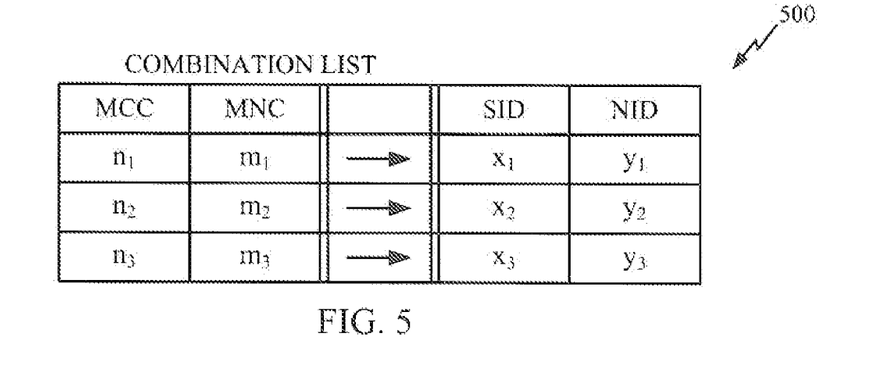
FIG. 5 depicts a memory storing provisioning information for both a GSM and a CDMA network.

The table 500 of FIG. 5 depicts a database of information that associates a SID/NID pair with each different MCC/MNC pair. In other words, the provisioning information for one type of communications network is associated with analogous provisioning information for another communications network. This table 500 may be maintained in the processor of the mobile device, or stored in a separate memory that is included within the mobile device. When the mobile device attempts to acquire a CDMA wireless network, its retrieves the SID/NID pair associated with the default or most preferred MCC/MNC pair. Using the SID/NID pair, the processor attempts to acquire the CDMA wireless network. If the mobile device is unable to acquire the CDMA wireless network, the process is repeated using SID/NID pairs associated with other preferred MCC/MNC pairs until the CDMA wireless network is acquired. SID/NID pairs associated with forbidden GSM networks are not used to acquire the CDMA wireless network.

As an alternative to maintaining a table in memory, the processor may employ an algorithin to map from MCC/MNC to SID/NID. In this case, the processor retrieves the default or most preferred MCC/MNC from the GSM SIM when attempting to acquire the CDMA wireless network. The processor then executes an algorithm using the retrieved MCC/MNC pair to generate a corresponding SID/NID pair. Using the SID/NID pair, the processor attempts to acquire the CDMA wireless network. This process may be repeated using different MCC/MNC pairs until the processor acquires the wireless CDMA network.

In another embodiment, the processor may employ an algorithm that generates the table on the fly. In response to some trigger, such as a user initiated command, the processor retrieves each of the MCC/MNC pairs that the mobile device is permitted to access and generates a corresponding SID/NID pair using the algorithm. The results may then be stored in the processor, or other memory in the mobile device.

Figure 6:
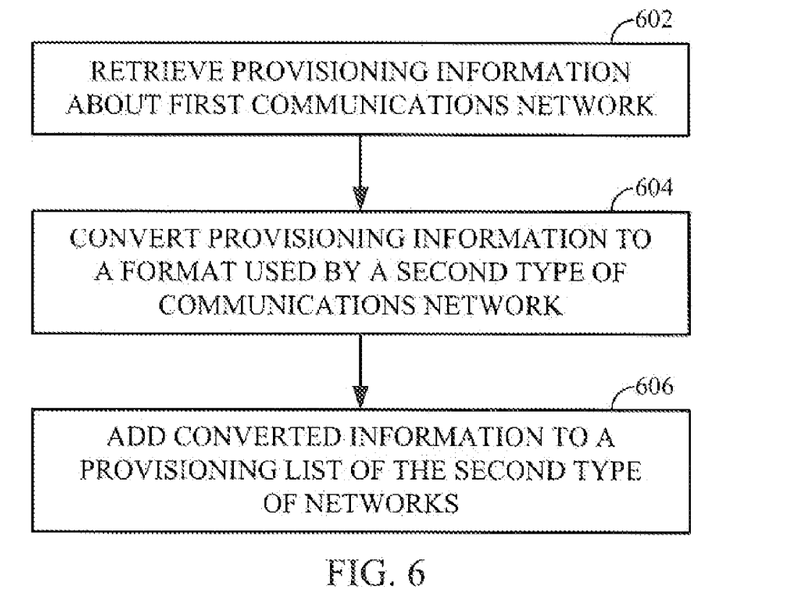
FIG. 6 depicts a flowchart of an exemplary method to convert provisioning information in a first format to provisioning information in a second format.

FIG. 6 provides a flowchart of an exemplary algorithm for mapping from one format of provisioning information to another. Such an algorithm may be performed by software or a combination of hardware and software executed by the processor of the mobile communications device. In step 602, the provisioning information for a first type of communications network is received or retrieved. Then, in step 604, the information is converted into a format that is useful for identifying networks of a second type. This converted format can then be added, in step 606, to a list of second type of networks to define a list of preferred or forbidden networks.

One exemplary technique for mapping between GSM and CDMA network identifiers is provided below. However, this is merely one example for these two types of networks and also is merely an example of two particular network technologies. Other techniques and networks are contemplated within the scope of the present invention.

The MCC is considered to be a three digit number including the digits(from left-to-right) $MCC_1$, $MCC_2$, $MCC_3$. The MNC is a three digit number including the digits (from left to right) $MNC_1$, $MNC_2$, $MNC_3$. Using the following formula:

$$R=(MCC_1\times100+MCC_2\times10+MCC_3)\times1000+(MNC_1\times100)+MNC_2\times10+MNC_3)$$

The result, R, ranges from 0 to 999999. This range of numbers may be represented by a 20-bit number. Therefore, the lower 16 bits are taken to be the NID. That leaves the upper four digits to represent the SID. By having a range of 16 SID reserved by the SID administration body, the reserved SIDs may be mapped to a 4-bit pattern 000 through 1111. For example if the reserved SIDs are 10832 to 10848, then 10832 would be 0000, 10833 would be 0001, etc. In this way every valid MCC/MNC can be mapped to a valid and unique SID/NID pair.

Figure 7:
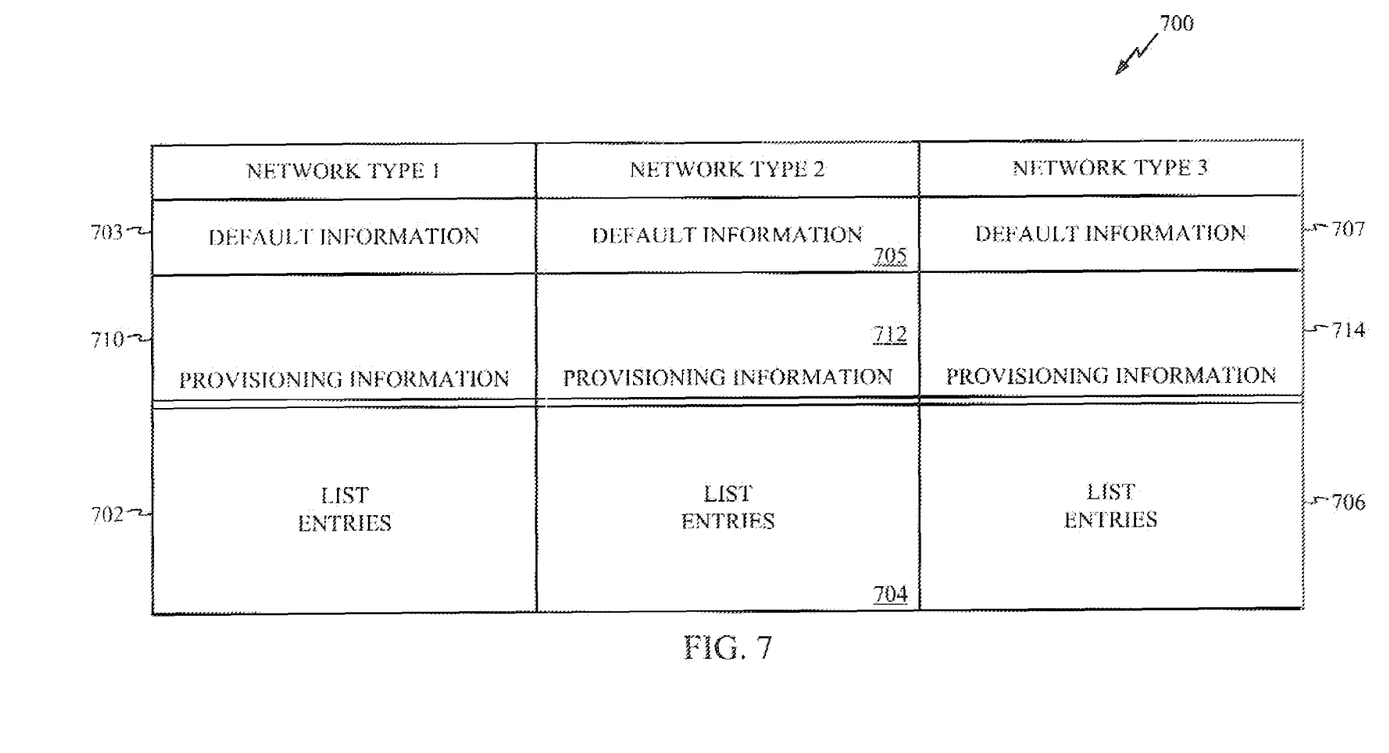
FIG. 7 depicts a conceptual view of a memory storing default provisioning information for a plurality of different networks.

FIG. 7 depicts a conceptual view of a non-volatile memory 700 that stores a variety of provisioning information for the wireless device 102 of FIG. 1. The memory 700 may be part of the memory 211 or it may be a separate memory device that is accessible by the processor 208. One of ordinary skill will recognize that many different physical implementations of memory devices may be used without departing from the scope of the present invention. Similarly, a variety of equivalent methods for organizing the data within the memory 700 are possible as well.

In general, the memory 700 has respective entries 702, 704, 706 for a number of different network technologies that the wireless device can access. For example, the wireless device 102 may be configured to communicate over a GSM or CDMA air interface, as discussed previously. In that case, the memory 700 would be configured with two columns: one for GSM and one for CDMA. Thus, there is respective provisioning information 710, 712, 714 for the different accessible networks in each of the different network technologies. This information can include, the home, or most preferred, network, a list of preferred partner networks, and forbidden, or negative preference, networks. Through the mapping or converting function described earlier, the provisioning information of one network technology 710 can be mapped into provisioning information 712, 714 of different network technologies. More particularly, a network identifier (e.g., a MCC/MNC pair) of one type of network is mapped to a corresponding network identifier (e.g., a SID/NOD pair) of a different type of network. When one entry in the first provisioning information 710 is deleted, then its corresponding entries in the other provisioning information 712, 714 may be deleted as well.

For example, a wireless device configured to communicate over a GSM air interface typically allows a user to edit the PLMN list. Using the keypad/user interface 210, a user may manually edit the PLMN list and also perform a manual scan that can add or delete entries from the PLMN list. Additionally, the memory that stores the provisioning information for a first network type (e.g., GSM) may be removed from the wireless device, thereby removing the capability to communicate via that network type. In these instances, the inaccessibility of provisioning information from the first network type (e.g., GSM) may prevent the wireless device from communicating over any of the other available network types. Accordingly, default provisioning information is stored in a non-volatile memory that is available regardless of what occurs with other provisioning information.

As shown, default provisioning information 703, 705 and 707 may be stored for each of the different network types, or air interface protocols. This table 700 specifically depicts three different network types, but fewer as well as more networks types may be available as well. The default provisioning information 703, 705, 707 may be in a variety of different formats depending on the protocols and capabilities of the corresponding network type. For example, for a GSM air interface, the default provisioning information may include a MCC/MNC pair for the subscriber's home network plus additional information to authenticate the subscriber that is typically found in the SIM. For a CDMA air interface, the default provisioning information may include a SID/NID pair for a most preferred network as well as additional information. For example, in a CDMA air interface, there are other network attributes such as frequency and channel that are needed before even the basic CDMA air interface signals can be acquired. Thus, as previously mentioned, the default information 703, 705, 707 may include information in addition to simply network identifiers. The default information may be used in conjunction with the mapping function described earlier to reconstruct the provisioning data for the wireless device for one or more of the network types, if that provisioning data is somehow deleted, destroyed, or otherwise unavailable.

For example, the default information 703 may be for a GSM air interface may include a MCC/MNC pair for a subscriber's home, or most preferred, network. The default information 705 may be for a CDMA network and include basic signaling parameters for a corresponding CDMA air interface. Using this information, the processor 208 of the wireless device may cause the MCC/MNC pair to be mapped to a corresponding SID/NID pair that is utilized along with the default information 705 for the CDMA network. Using this combination of information, the wireless device may acquire the CDMA network and establish a connection. From this connection, a PRL list may be received as is known in CDMA systems. Thus, the default provisioning information for each network type may include a network identifier or it may include provisioning information that is not mappable using the above-described techniques. Regardless, the default information 703, 705, 707 is useful in conjunction with one another to allow reconstruction of a provisioning list (e.g., PLMN, PRL, etc.) for one or more of the available networks.

In another example, simply generating a PRL list from a PLMN list may not result in the PRL list including information about all available CDMA radio access networks, especially in cases where a manual scan may have removed entries from the PLMN. In such an instance, the non-volatile memory may be used to store a PRL that includes CDMA radio access networks that may not have a corresponding GSM radio access network. The resulting combination PRL that will result will include networks that correspond to mapped GSM radio access networks in the SIM as well as other CDMA radio access networks that are not mapped.

The default provisioning information may be acquired in a variety of different ways. For example, one set of default information 703 may be programmed into the wireless device by an operator that initially configures the wireless device. Other default information 705 may be automatically acquired over a network connection and stored (manually or in response to a programmatic event) in the memory. Additionally, the default information may be manually entered by a user. In any case, the processor 208 can be configured to prevent a user from modifying the default information once it is stored. This prevention may be accomplished at different levels such as by simply preventing all user access to the data once it is stored or querying the user with warning messages if the user attempts to modify this default information.

A number of variations to the specific behaviors and steps described in the above examples may be made without departing from the scope of the present invention. The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The invention claimed is:

1. A wireless device capable of communicating with multiple network types, comprising:
    a transceiver configured to communicate with any of a plurality of network types over a wireless media, each of the plurality of network types having a different air interface protocol;
    a non-volatile memory configured to store respective default provisioning data for more than one of the plurality of network types; and
    a processor configured to convert default provisioning data for a first of the plurality of network types into corresponding provisioning information for a second of the plurality of network types, wherein the processor is further configured to use the corresponding provisioning information and the default provisioning data associated with the second of the plurality of network types to cause the transceiver to acquire and establish a connection with the second of the plurality of network types.

2. The wireless device of claim 1, further comprising:
    a processor configured to use one of the respective default provisioning data to cause the transceiver to establish a connection with the corresponding one of the plurality of network types.

3. The wireless device of claim 1, wherein the default provisioning data associated with the second of the plurality of network types includes signaling information related to a corresponding air interface protocol.

4. The wireless device of claim 1, wherein the plurality of network types include a GSM network and a CDMA network.

5. The wireless device of claim 1, wherein the plurality of network types includes a wireless LAN.

6. The wireless device of claim 1, wherein default provisioning data for a first of the plurality of network types includes an MCC/MNC pair for a OSM network.

7. The wireless device of claim 1 wherein the corresponding provisioning information for a second of the plurality of network types includes an SID/NID pair for a CDMA network.

8. The wireless device of claim 1, further comprising:
    a memory accessible by the processor and configured to store provisioning information for one or more of the plurality of network types.

9. The wireless device of claim 8, further comprising:
    a user interface configured to permit a user to modify the provisioning information.

10. The wireless device of claim 8, wherein the processor is further configured to prevent a user from modifying the default provisioning data.

11. The wireless device of claim 8 wherein the memory and the non-volatile memory are one and the same.

12. The wireless device of claim 1, wherein the processor is further configured to construct a provisioning list comprising the corresponding provisioning information and the default provisioning data associated with the second of the two network types defined as new provisioning information for the second of the plurality of network types.

13. The wireless device of claim 12, wherein the provisioning list includes a CDMA PRL.

14. The wireless device of claim 12, wherein the provisioning list includes a GSM PLMN.

15. The wireless device of claim 1, wherein the processor further comprises an algorithm that generates the corresponding provisioning information based on the default provisioning data for the first of the plurality of network types.

16. The wireless device of claim 1, wherein the default provisioning data for the second of the plurality of network types is not mappable from the default provisioning data for the first of the plurality of network types.

17. A method for generating a provisioning list for a wireless device capable of communicating with multiple network types and having a transceiver configured to communicate with either one of two network types over a wireless medium, each of the two networks having a different air interface protocol, the method comprising:
    retrieving first default provisioning information for a first of the network types;
    retrieving second default provisioning information for a second of the network types;
    converting the first default provisioning information into corresponding provisioning information for the second of the network types; and
    building the provisioning list using the second default provisioning information and the corresponding provisioning information combined as new provisioning information for the second of the network types, wherein the new provisioning information enables the wireless device to acquire and establish a connection with the second of the network types.

18. The method of claim 17 further comprising:
    preventing a user of the wireless device from modifying the default provisioning information.

19. The method of claim 17, wherein the provisioning list includes a home network.

20. The method of claim 17, wherein the provisioning list includes one or more preferred networks.

21. The method of claim 17, wherein the provisioning list includes one or more forbidden networks.

22. The method of claim 17, wherein the second default provisioning information includes signaling information related to a corresponding air interface protocol.

23. The method of claim 17, wherein the converting further comprises executing an algorithm that generates the corresponding provisioning information based on the first default provisioning information.

24. The method of claim 17, wherein the second default provisioning information is not mappable from the first default provisioning information.

25. A computer readable storage medium containing a set of instructions for generating a provisioning list for a wireless device capable of communicating with multiple network types and having a transceiver configured to communicate with either one of two network types over a wireless medium, each of the two networks having a different air interface protocol, said instructions comprising:
- a routine to retrieve first default provisioning information for a first of the network types;
- a routine to retrieve second default provisioning information for a second of the network types;
- a routine to convert the first default provisioning information into corresponding provisioning information for the second of the network types; and
- a routine to build the provisioning list using the second default provisioning information and the corresponding provisioning information combined as new provisioning information for the second of the network types, wherein the new provisioning information enables the wireless device to acquire and establish a connection with the second of the network types.

26. The instructions of claim 25, wherein the second default provisioning data associated with the second of the network types includes signaling information related to a corresponding air interface protocol.

27. The instructions of claim 25, wherein the first default provisioning data includes an MCC/MNC pair for a GSM network, and wherein the corresponding provisioning information for the second of the network types includes an SID/NID pair for a CDMA network.

28. The instructions of claim 25, wherein the routine to convert further comprises an algorithm that generates the corresponding provisioning information based on the first default provisioning data.

29. The instructions of claim 25, wherein the second default provisioning data is not mappable from the first default provisioning data.

30. A wireless device capable of communicating with multiple network types, comprising:
- means for communicating with any of a plurality of network types over a wireless media, each of the plurality of network types having a different air interface protocol;
- means for storing respective default provisioning data for more than one of the plurality of network types; and
- means for converting default provisioning data for a first of the plurality of network types into corresponding provisioning information for a second of the plurality of network types, wherein the means for converting is further configured to use the corresponding provisioning information and the default provisioning data associated with the second of the plurality of network types to cause the means for communicating to acquire and establish a connection with the second of the plurality of network types.

31. The wireless device of claim 30, wherein the default provisioning data associated with the second of the plurality of network types includes signaling information related to a corresponding air interface protocol.

32. The wireless device of claim 30, wherein default provisioning data for a first of the plurality of network types includes an MCC/MNC pair for a GSM network, and wherein the corresponding provisioning information for a second of the plurality of network types includes an SID/NID pair for a CDMA network.

33. The wireless device of claim 30, wherein the means for converting further comprises an algorithm that generates the corresponding provisioning information for a second of the plurality of network types based on the default provisioning data for a first of the plurality of network types.

34. The wireless device of claim 30, wherein the default provisioning data associated with the second of the plurality of network types is not mappable from the default provisioning data of the first of the plurality of network types.

* * * * *

UNITED STATES PATENT AND TRADEMARK OFFICE
CERTIFICATE OF CORRECTION

PATENT NO. : 7,630,711 B2  Page 1 of 1
APPLICATION NO. : 11/326635
DATED : December 8, 2009
INVENTOR(S) : Nagaraj et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this

Twenty-first Day of December, 2010

David J. Kappos
*Director of the United States Patent and Trademark Office*